(No Model.)
J. EMERY.
LASTING MACHINE.
No. 436,700.
12 Sheets—Sheet 1.
Patented Sept. 16, 1890.
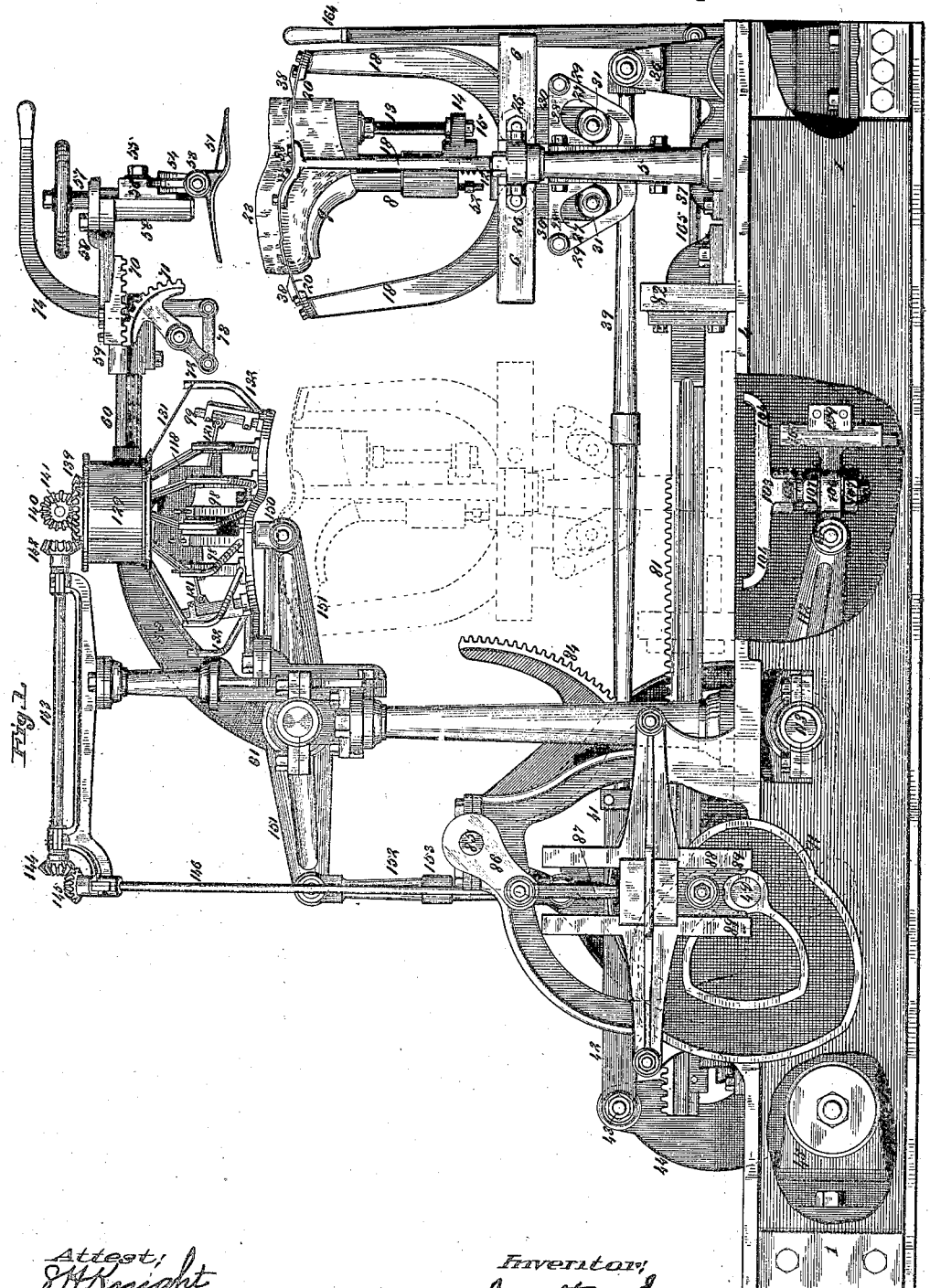

(No Model.)
J. EMERY.
LASTING MACHINE.
No. 436,700.  12 Sheets—Sheet 2.
Patented Sept. 16, 1890.
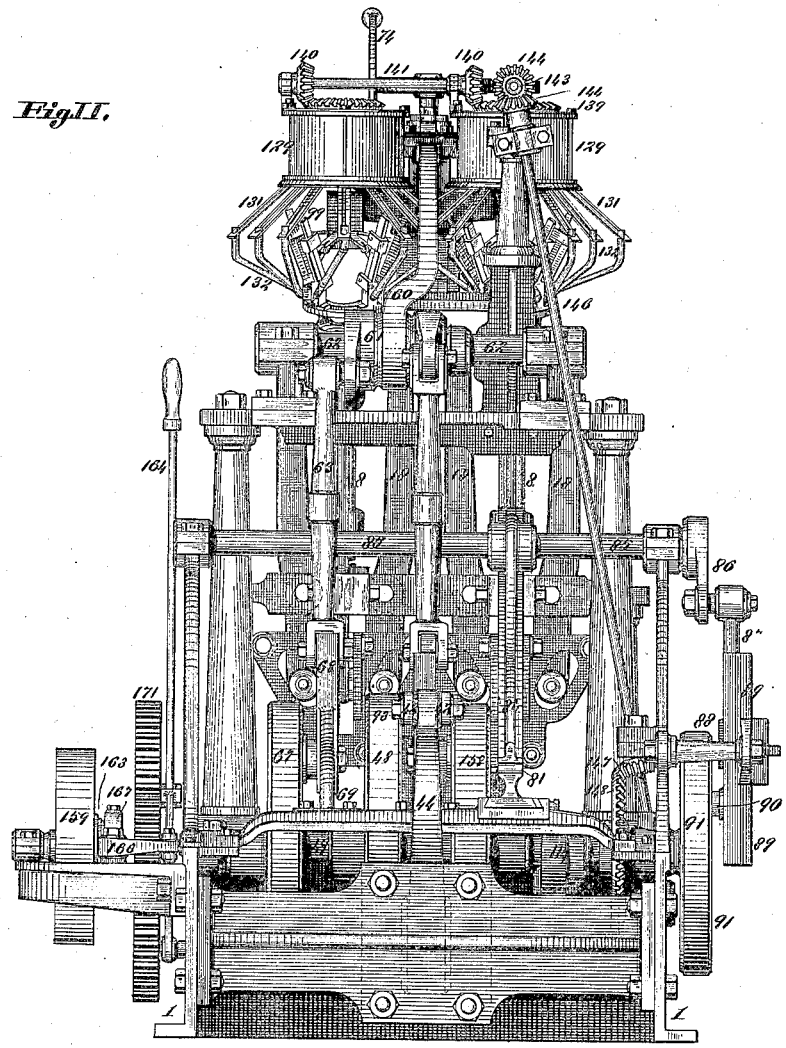
Fig. II.
Attest: S H Knight, E Arthur
Inventor: Jonathan Emery
By King & Bro., Attys.

(No Model.) 12 Sheets—Sheet 3.
J. EMERY.
LASTING MACHINE.
No. 436,700. Patented Sept. 16, 1890.
Fig. III.
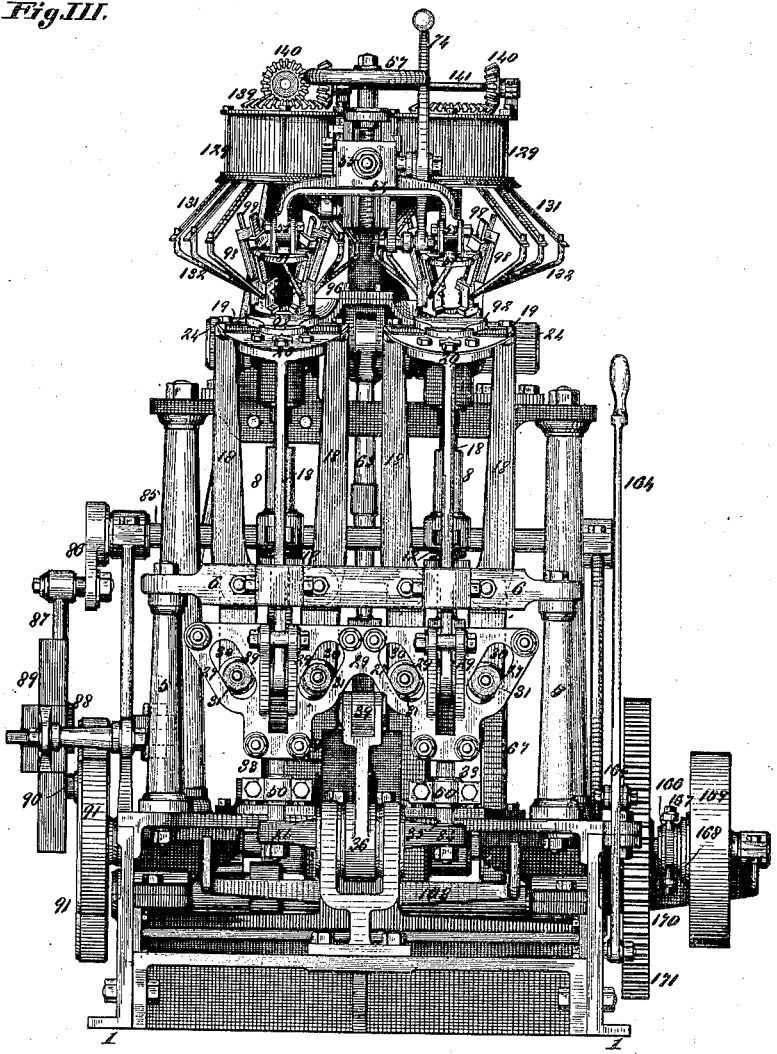
Attest:
S. H. Knight
E. Arthur
Inventor:
Jonathan Emery.
By Knight & Bro
Attys.

(No Model.)  
12 Sheets—Sheet 4.
J. EMERY.
LASTING MACHINE.
No. 436,700. Patented Sept. 16, 1890.
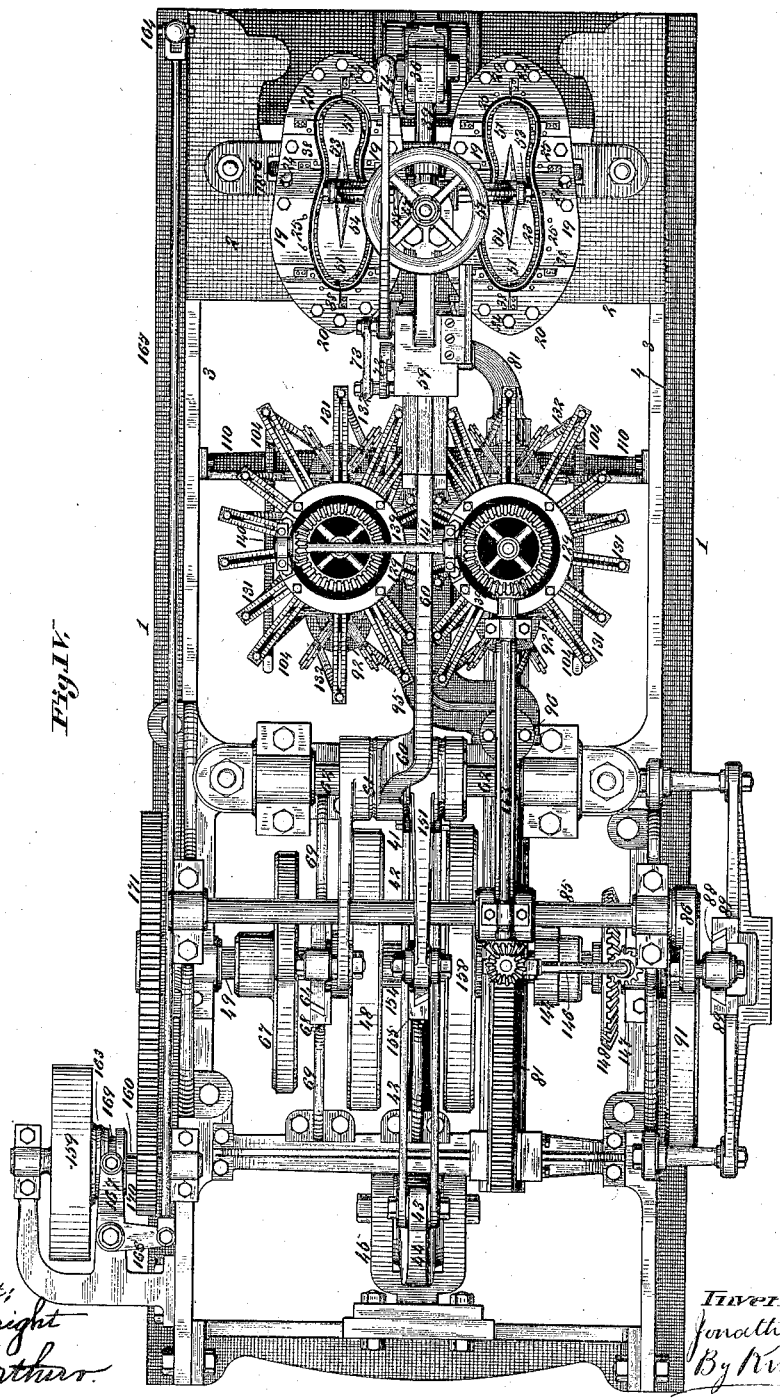
Fig. IV.
Attest:  
S. H. Knight  
E. Arthur
Inventor,  
Jonathan Emery.  
By Knight Bros.  
Attys.

(No Model.)  
12 Sheets—Sheet 5.
J. EMERY.
LASTING MACHINE.
No. 436,700.  
Patented Sept. 16, 1890.
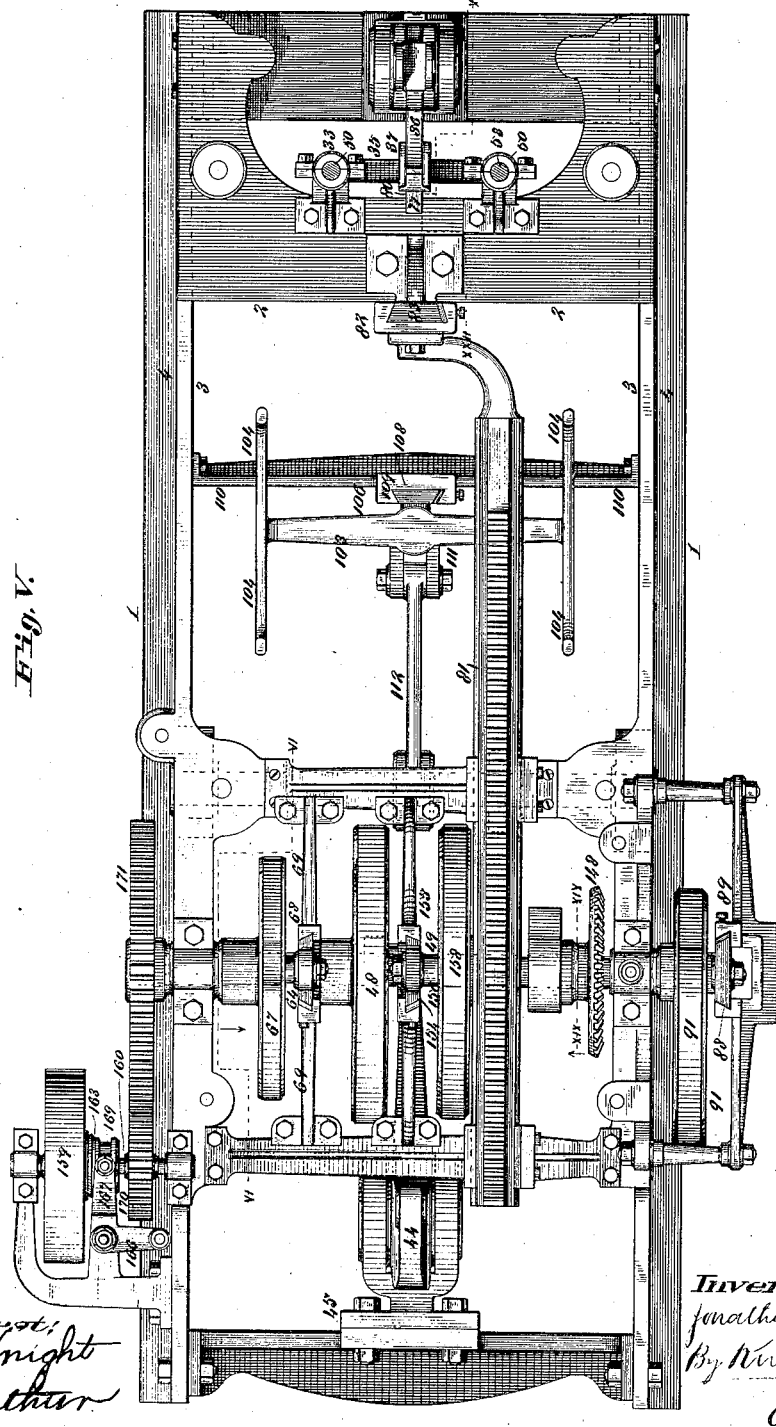

(No Model.) J. EMERY. 12 Sheets—Sheet 6.
LASTING MACHINE.
No. 436,700. Patented Sept. 16, 1890.
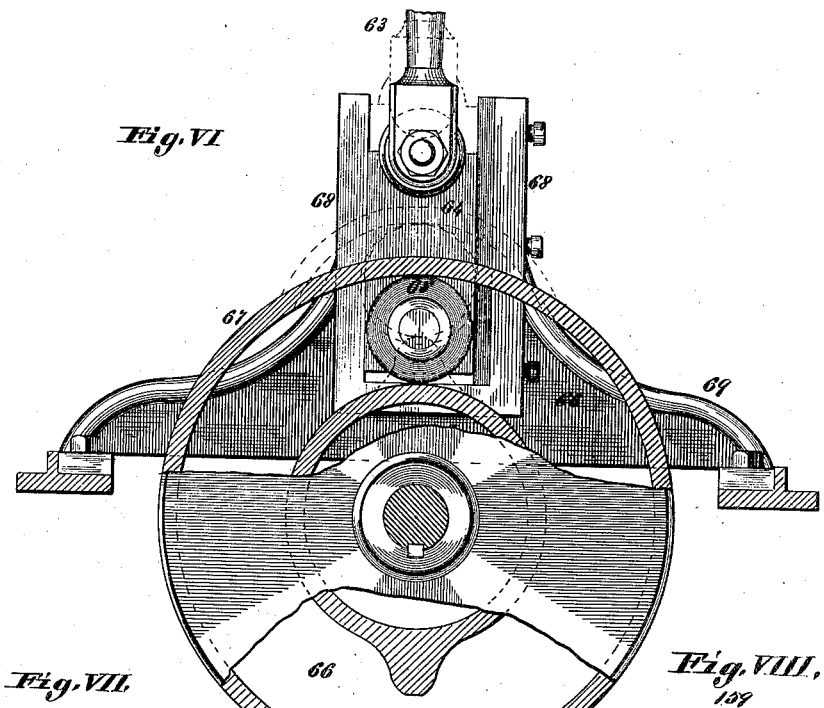
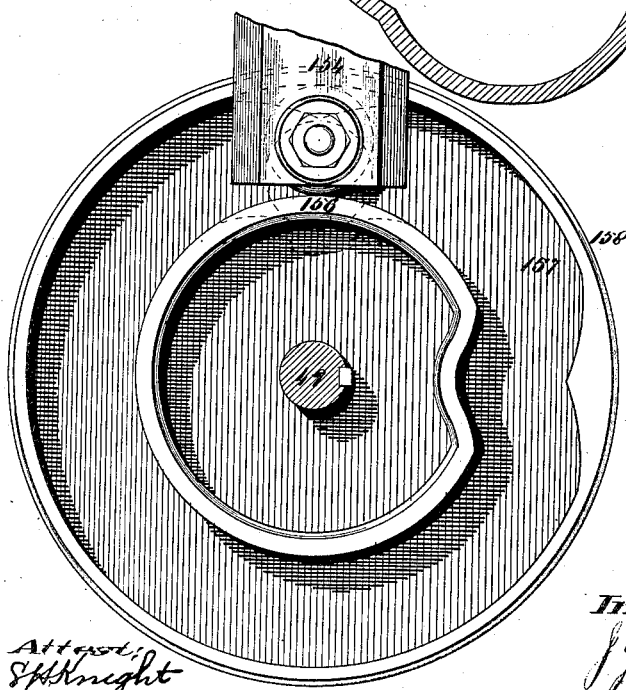
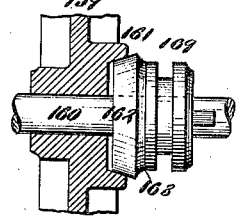
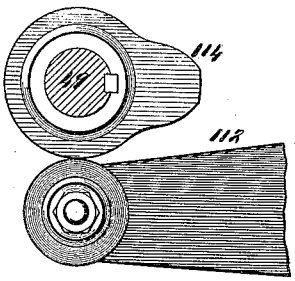
Attest:
S. H. Knight
E. Arthur
Inventor:
Jonathan Emery.
By Knight & Bro.
Attys.

(No Model.)
12 Sheets—Sheet 7.
J. EMERY.
LASTING MACHINE.
No. 436,700. Patented Sept. 16, 1890.
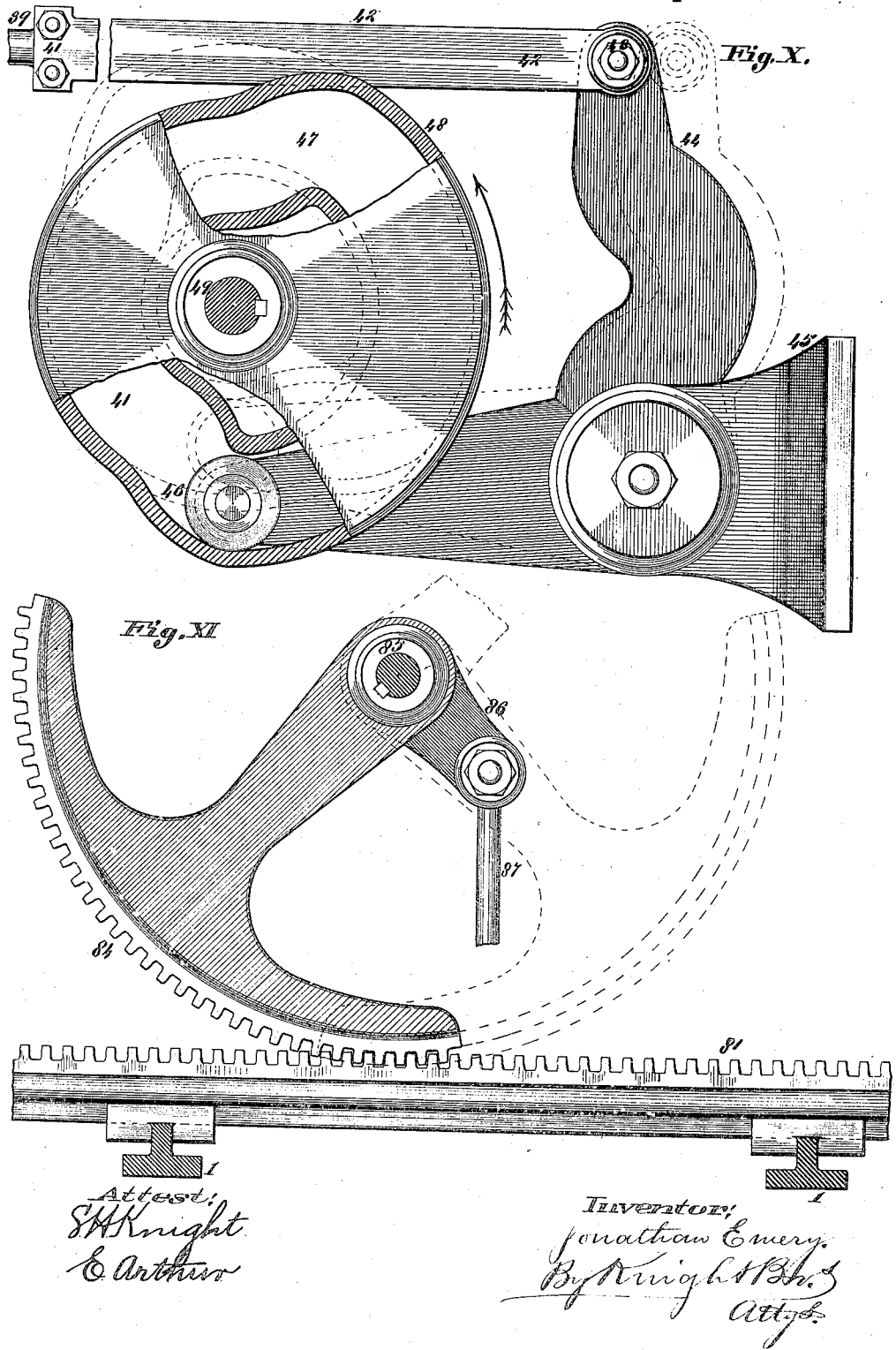

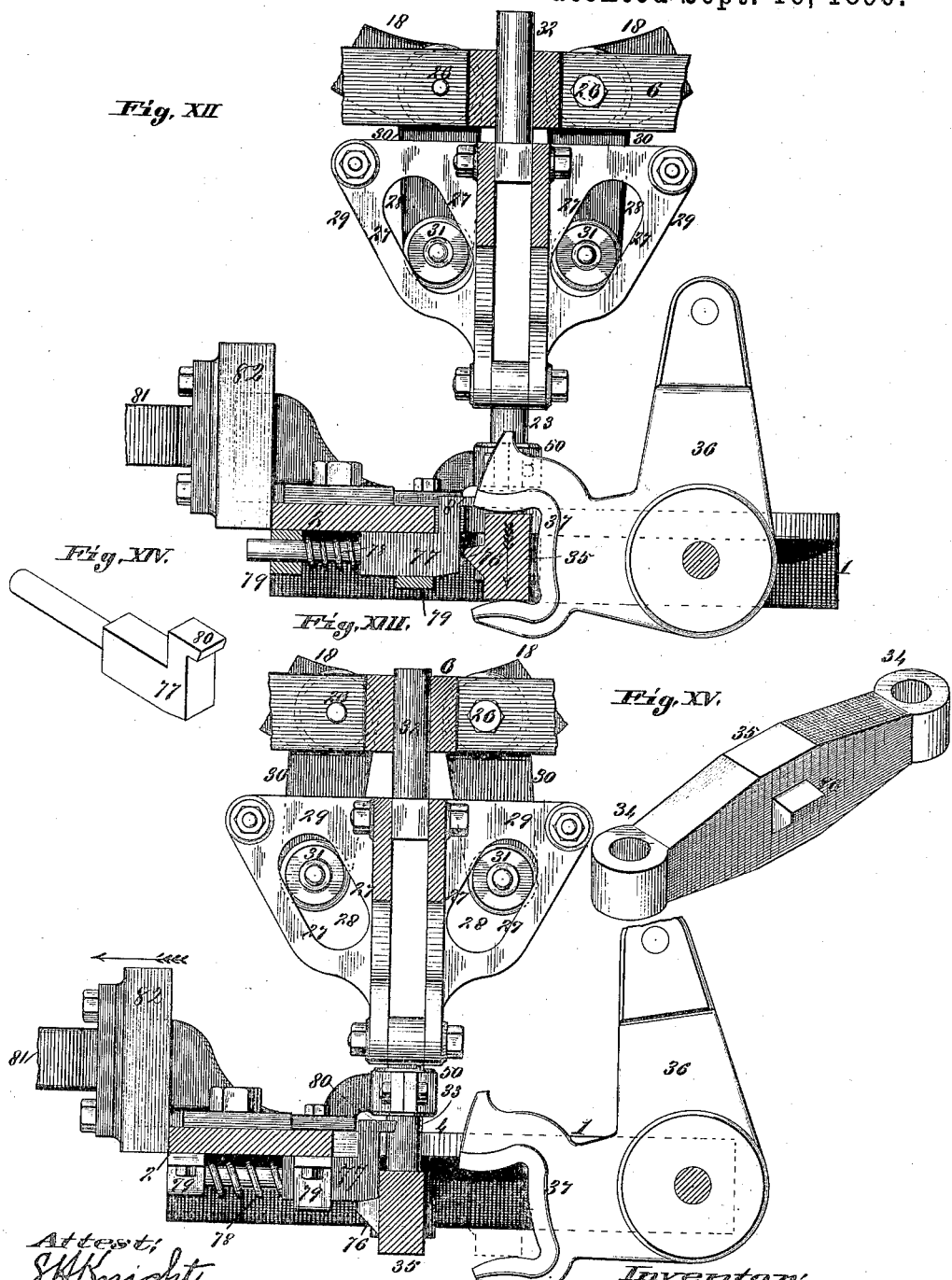

(No Model.) 12 Sheets—Sheet 9.
J. EMERY.
LASTING MACHINE.
No. 436,700. Patented Sept. 16, 1890.
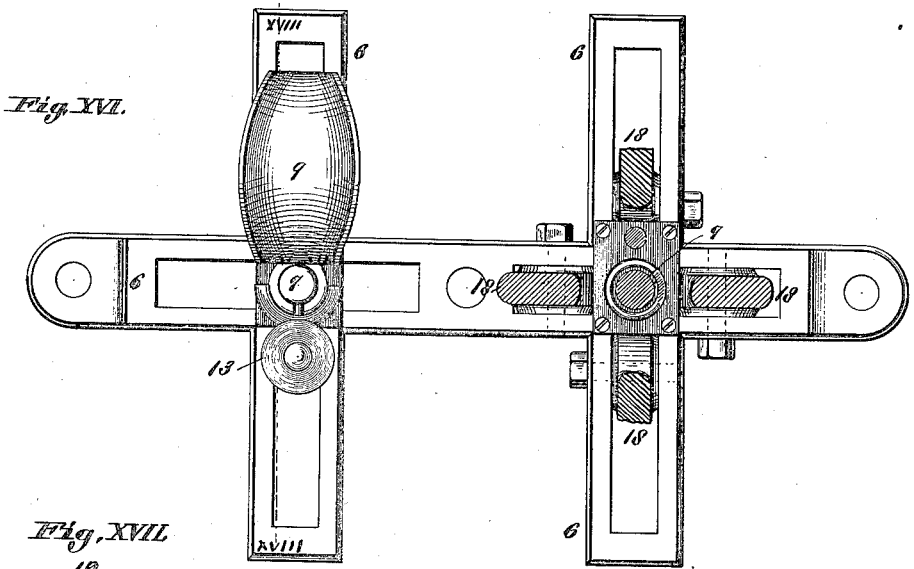
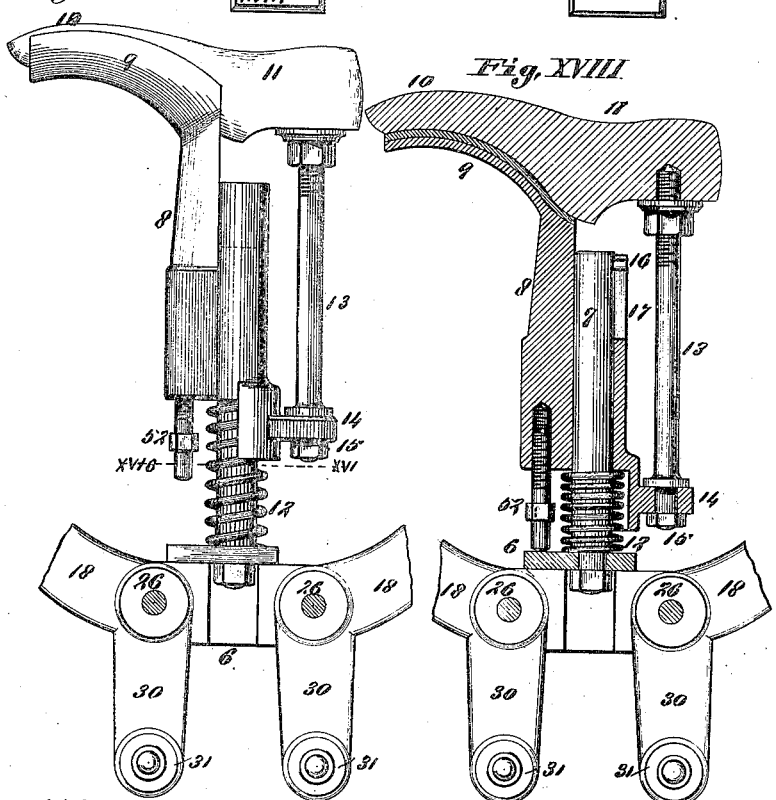
Attest:
S. H. Knight
E. Arthur
Inventor:
Jonathan Emery
By Knight Bros.
Attys.

(No Model.) 12 Sheets—Sheet 10.
J. EMERY.
LASTING MACHINE.
No. 436,700. Patented Sept. 16, 1890.
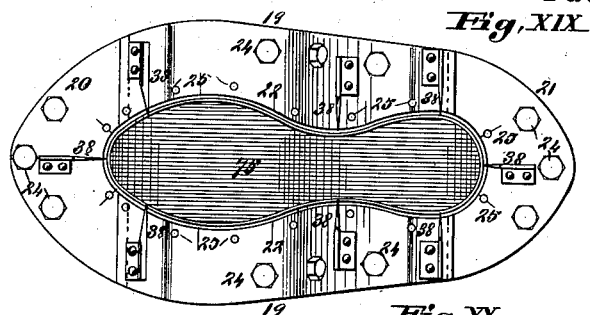
Fig. XIX.
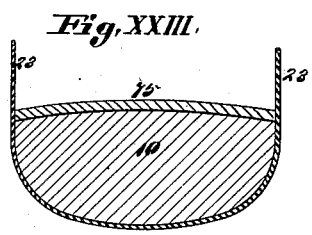
Fig. XXIII.
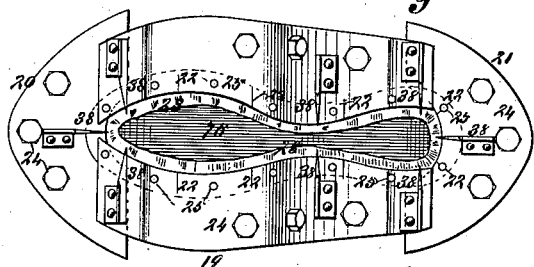
Fig. XX.
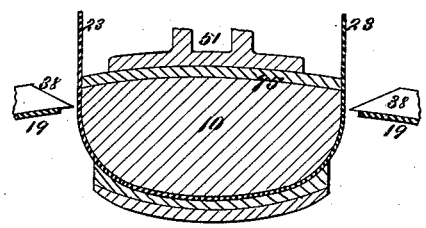
Fig. XXIV.
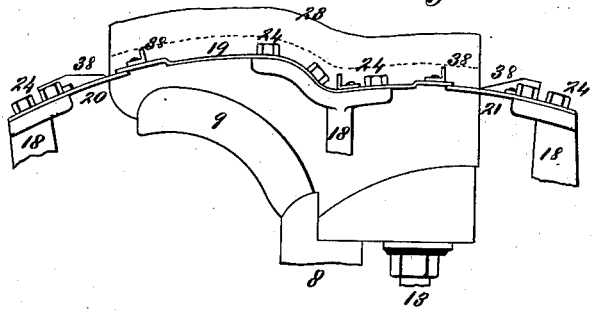
Fig. XXI.
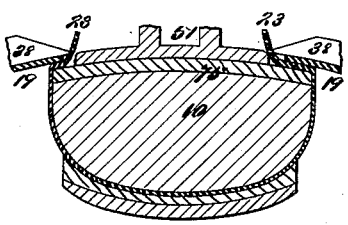
Fig. XXV.
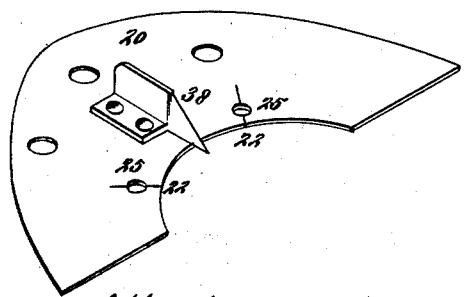
Fig. XXII.
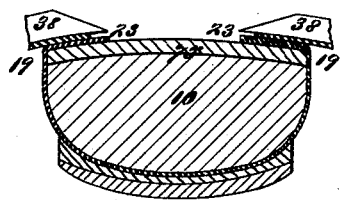
Fig. XXVI.
Attest:
S. H. Knight
E. Arthur
Inventor:
Jonathan Emery.
By Knight Bros.
Attys.

(No Model.) 12 Sheets—Sheet 11.
J. EMERY.
LASTING MACHINE.
No. 436,700. Patented Sept. 16, 1890.
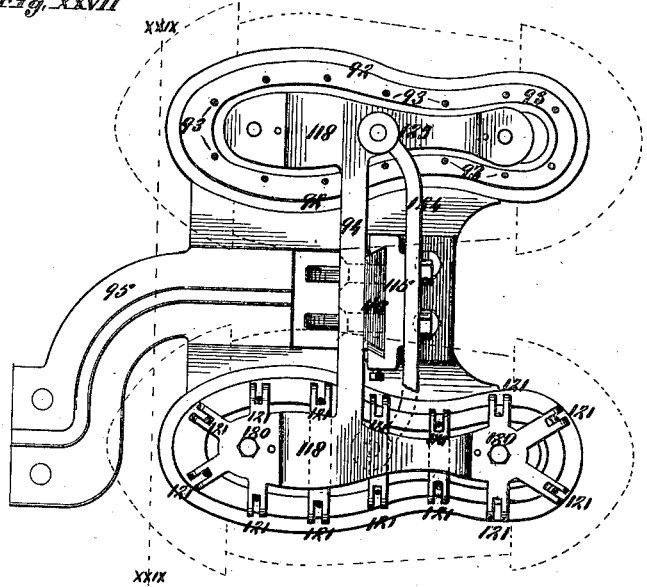
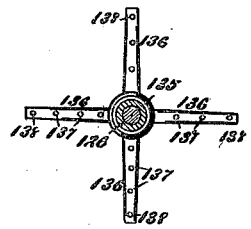
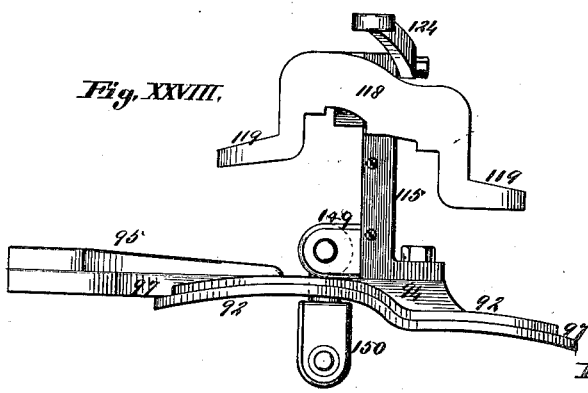
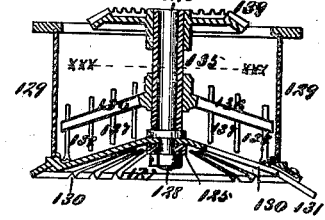
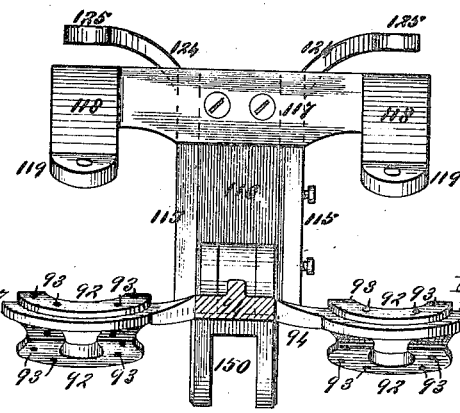
Attest:
S. H. Knight
E. Arthur
Inventor:
Jonathan Emery.
By Knight Bros.
Attys.

(No Model.)  
12 Sheets—Sheet 12.
J. EMERY.
LASTING MACHINE.
No. 436,700. Patented Sept. 16, 1890.
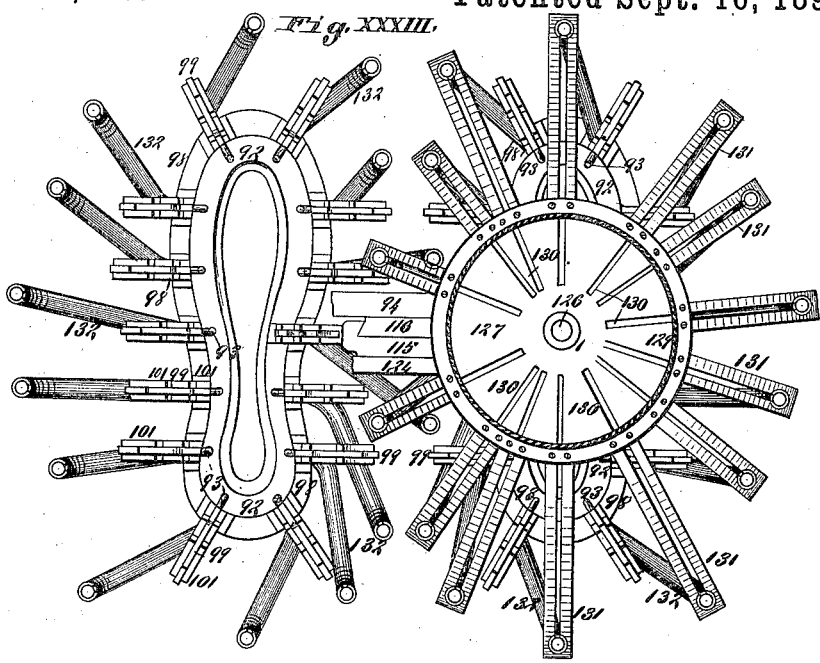
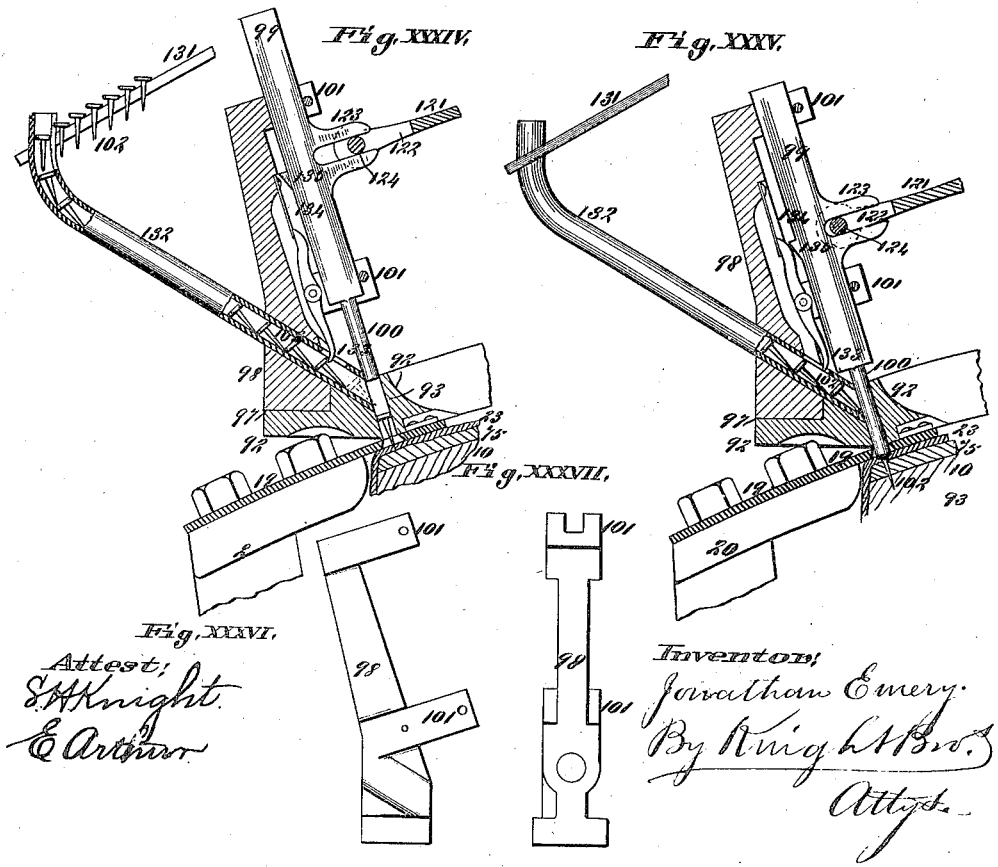
Attest:  
S. H. Knight  
E. Arthur
Inventor:  
Jonathan Emery.  
By Knight Bro.  
Attys.

UNITED STATES PATENT OFFICE.

JONATHAN EMERY, OF ST. LOUIS, MISSOURI, ASSIGNOR OF ONE-EIGHTH TO MICHAEL CLEARY, OF SAME PLACE.

LASTING-MACHINE.

SPECIFICATION forming part of Letters Patent No. 436,700, dated September 16, 1890.

Application filed November 4, 1889. Serial No. 329,135. (No model.)

*To all whom it may concern:*

Be it known that I, JONATHAN EMERY, of the city of St. Louis, in the State of Missouri, have invented a certain new and useful Improvement in Lasting-Machines, of which the following is a full, clear, and exact description, reference being had to the accompanying drawings, forming part of this specification.

This is a machine for the application of the upper-leather of a boot or shoe to the insole and fixing it thereto. Parts are duplicated in the machine which is shown, so that two uppers may be lasted simultaneously.

Figure I is a side elevation of the machine with the parts in normal position or position of rest. Fig. II is a rear elevation. Fig. III is a front elevation. Fig. IV is a top view. Fig. V is a top view or plan of the base with the upper works removed. Fig. VI is an enlarged vertical longitudinal section at lines VI VI, Fig. V. Fig. VII is an elevation of the tacker-cam. Fig. VIII is a detail section of the hub of the driving-pulley, showing the clutch. Fig. IX is an enlarged section at IX IX, Fig. V. Fig. X is an enlarged detail elevation of the crimper-cam with connected parts, portions being broken away. Fig. XI is an enlarged elevation of the carriage-rack and quadrant. Fig. XII is an enlarged vertical longitudinal section at XII XII, Fig. V, with parts in normal position. Fig. XIII is a similar view to Fig. XII, except that the carriage is shown moving backward. Fig XIV is a perspective view of the locking-dog by which the crimpers are retained in their inner position as the carriage moves backward. Fig. XV is a perspective view of the cross-head. Fig. XVI is a top view of the last-stands, part in horizontal section, at XVI XVI, Fig. XVII. Fig. XVII shows the last and holder in side view and elevated. Fig. XVIII is a vertical longitudinal section at XVIII XVIII, Fig. XVI, with last and holder in section and depressed. Fig. XIX is a top view of one set of the crimpers in normal or outer position. Fig. XX is a top view of one set of crimpers in the inner or crimping position. Fig. XXI is a side view of one set of crimpers surrounding the last. Fig. XXII is an enlarged perspective view of one of the crimpers. Figs. XXIII, XXIV, XXV, and XXVI are transverse sections through the last and leather, showing the process of crimping. Fig. XXVII is a plan view of the ram-frame and supporting-arm, a ram being shown in position upon one side and removed from the other side. Fig. XXVIII is a side elevation of the ram-frame with the rams removed. Fig. XXIX is a vertical transverse section at XXIX XXIX, Fig. XXVII. Fig. XXX is a horizontal section at XXX XXX, Fig. XXXI. Fig. XXXI is a vertical section of the tack-hopper. Fig. XXXII is a perspective view of one of the claws upon the tack-stirrer. Fig. XXXIII is a plan of the tack-guides with one tack-hopper removed and the other in horizontal section with the stirrer removed. Figs. XXXIV and XXXV are enlarged vertical sections through the ram-stand, showing the tack-guides part in section, and with rams in the two figures respectively in upper and lower position. Fig. XXXVI is a side elevation of the ram-stand. Fig. XXXVII is an end elevation of the ram-stand.

1 is the bed or base-frame of the machine.

2 is the base-plate of the carriage, upon which the lasts and crimpers are supported. This carriage has longitudinal movement on the base-frame upon supporting guides or rails 3 and between side guides 4. (See Figs. IV, V, and XIII.) The carriage has also a vertical movement when beneath the tacking devices, for a purpose to be hereinafter explained.

The machine will be described as it is shown—namely, with means for lasting two shoes simultaneously; but it may be constructed for lasting only one shoe or for lasting more than two simultaneously.

At 5 are standards, which are firmly fixed to the carriage-base at the bottom and which support a horizontal plate 6. (See Figs. I and III.) To the plate 6 are fixed upright last-supporting rods 7, which are preferably made round and which occupy a socket in the saddle-piece 8, which has a saddle 9, upon which the front part 10 of the last 11 is laid. The saddle-piece rests upon a spiral spring 12, which surrounds the rod 7, and whose lower end bears upon the plate 6, while its upper end bears against the lower end of the saddle-piece. The tendency of the spring is to keep the saddle-piece in its upper or normal position, as seen in Fig. XVII.

To the rear part of the last is fixed a screw-rod 13, which, when the last is in position on the saddle 9, extends vertically downward, and whose lower end is secured to a lug 14 upon the saddle-piece by a nut 15, screwing on the rod 13. (See Figs. I, XVII, and XVIII.) By this rod the last is held in position on the saddle.

The saddle-piece is prevented from turning on the guide-rod 7 by a pin 16 on the rod, which works in a vertical slot 17 of the saddle-piece. (See Fig. XVIII.)

The crimpers will now be described.

18 are levers, of which there are four for each last. Two of the levers carry the side-crimper plates 19, and the other two levers carry the toe-crimper 20 and heel-crimper 21, respectively.

The crimpers are made of thin steel plates, which are slitted from the edges inward at 22 for some distance, so that the edges spring with sufficient freedom to accommodate themselves to the edge 23 of the leather which is being folded over upon the last. (See Figs. I, IV, XXIII, XXIV, XXV, and XXVI.)

The crimpers are fixed to the upper ends of the levers 18 by screws 24, so that they may be removed and others substituted when a shoe of a different size is being lasted.

At 25 are holes in the crimper-plates, through which the nails are driven into the leather. (See Figs. XIX, XX, XXI, and XXII.)

In order to force the crimpers inward to fold the edge 23 down upon the insole, the levers 18 are swung on their fulcrums 26 by inclines 27, forming the margins of the slots 28 made in the inclined plates 29. The inclined plates are in pairs, one pair for each of the levers 18, whose lower arm 30 extends down between the plates and carries upon each side an anti-friction wheel 31, said wheels occupying the inclined slots 28, so that as the inclined plates are moved upward and downward the upper ends of the crimping-levers are moved outward and inward. (See Figs. I, III, XII, XIII, XVII, and XVIII.)

The inclined plates for each last are all secured together and to an upwardly-extending guide-rod 32, that works through a guide-hole in the plate 6. (See Figs. XII and XIII.) The lower ends of the inclined plates are connected by a rod 33 to one end 34 of a cross-head 35, so that they rise and fall with the said cross-head. (See Figs. III, V, XII, XIII, and XV.)

36 is a bell-crank lever having jaws 37 engaging the cross-head 35 at the middle of the cross-head when the carriage is in the position indicated in Fig. XII, so that the movement of the lever from the position of Fig. XII to that of Fig. XIII causes the inclined plates 29 to descend and the upper ends of the crimpers to move inward from the position shown in Fig. XIX to the position shown in Fig. XX, thus folding over and crimping the edge of the leather. (See Figs. I, V, XII, and XIII.)

38 are cutters on and at right angles to the crimpers, which, as the crimpers move in, slit the edge of the leather at the points required. (See Figs. XIX to XXVI, inclusive.)

39 is a rod connected to the upper arm of the bell-crank 36. The rod has an extension-joint 40, by which its length may be changed. The rear end of the rod 39 is connected by screws 41 with two link-rods 42, whose other ends are connected by a pin 43 with the upper arm of a bell-crank 44. The bell-crank is fulcrumed to the bracket 45. (See Figs. I, II, IV, and X.) The horizontal arm of the bell-crank 44 carries an anti-friction roller 46, which travels the channel 47 of a rotary cam 48 upon the main shaft 49. (See Figs. I, II, V, and X.) It will be seen that the shape of the channel is such that the rock-shafts 36 and 44 remain during nearly one-half of the rotation of the cam in each of the two positions. The cam turns in the direction indicated by the arrow, and its position in Fig. X is such that the jaws 37 are in their upper position, as seen in Fig. XII, and are on the point of being depressed to their lower position (shown in Fig. XIII) by the upward movement of the horizontal arm of bell-crank 44 and the downward movement of the horizontal arm of bell-crank 36. The rods 33, by which the inclined plates are connected to the cross-head, work in the bearings 50. (See Figs. III, V, XII, and XIII.)

When the last with the upper is put upon the saddle 9 and the insole is in place upon the last, the parts are at first in the relative position shown in Figs. I, III, and XIV. Then the presser-plate 51 descends upon the insole and presses it tightly down upon the last, at the same time pressing the last down into its lower position, as seen in Figs. XVII, XXV, and XXVI. As the last reaches its lower position the lower end of a screw 52 comes against the plate 6 and arrests the further descent. (See Figs. I, IV, XVII, XVIII, XXIV, XXV.) This screw 52 may be vertically adjusted in the saddle-piece to adjust the lower position of the last as may be required, it being understood that with a smaller last the saddle would not descend to so low a position as with a larger last, as the relative position of the last and crimpers when the latter are moved inward must be such that the crimpers will fold the edge of the upper closely down upon the top of the insole, as seen in Figs. XX, XXV, and XXVI. The presser-plates 51 are hinged at 53 to the ends of a cross-bar 54, which is made fast to a block 55, secured between guides 56.

57 is a hand-screw working in the socket of the plate 58, which is fixed to or forms part of the head 59. The hand-screw has collars preventing its upward or downward movement in the plate 58 and screws in a screw-socket of the block 55, so that by turning the hand-screw the block and the presser-plate may be vertically adjusted. (See Figs. I, III, and IV.) The head 59 is longitudinally adjustable on the end of an arm 60, which forms part of a bell-crank lever 61 upon a shaft or fulcrum-rod 62. The other arm of this lever is connected by a rod 63 to a vertical slide 64, which carries an anti-friction roller 65, traveling the channel 66 of a rotary cam 67 upon the main shaft 49. (See Figs. I, II, VI, and VII.) This cam gives the necessary vertical movement to the presser-plate. The slide 64 works between guides 68 of a bridge-bar 69. In order to give means for the longitudinal adjustment of the head 59 upon the arm 60, the head has a cog-rack 70, which is engaged by a cog-sector 71 upon a lever 72, that is fulcrumed upon the arm 60 and connected by a link 73 to a hand-lever 74. (See Figs. I, II, III, and IV.) The presser-cam 67 and crimper-cam 48 are so timed that the presser 51 reaches its lower position just before the crimpers begin to move inward, and as soon as the crimpers have moved inward a little distance (so as to engage the last by means of the leather) the presser rises to allow the crimpers to reach their inner position. These movements are illustrated in Figs. XXIII to XXVI, inclusive. Fig. XXIII shows the insole 75 in position. Fig. XXIV shows the presser 51 upon the insole and the last 10 in its upper position. Fig. XXV shows the last in its lower position and the crimpers 19 moved inward somewhat, and Fig. XXVI shows the crimpers in their inner position. It will be remembered that the crimpers are forced inward by the descent of the cross-head 35. Now it is required that the crimpers should remain in their inner position until the edge 23 of the "upper" is tacked down to the insole, and the device for holding the cross-head down to this end will now be described. Upon the cross-head is a projection or tooth 76, which, as the cross-head reaches its lower position, is engaged by longitudinally-moving bolt 77, pushed forward by a spring 78. The bolt works in bearings 79 upon the bottom of the carriage 2. The rear end of the spring bears against the rear one of these bearings and its fore end against the enlarged part of the bolt. When the carriage is in its forward position, as seen in Fig. XII, a projection 80 upon the front end of the bolt bears against the upper member of the jaws 37, so as to keep the bolt out of the course of the tooth 76. Then as the carriage moves forward, and the cross-head with it, the tooth 76 is carried beneath the spring-bolt and the cross-head is kept in its lower position while the carriage is making its forward movement and until its return brings the projection 80 against the jaw 37, when the continued forward movement of the carriage moves the tooth 76 from beneath the spring-bolt, so that the cross-head may be carried up with the jaw 37 at its next ascent. (See Figs. XII, XIII, XIV, and XV.)

The lasts are carried from the crimping to the tacking position by the forward movement of the carriage, which movement is accomplished by the mechanism to be now described.

81 is a cog-rack bar whose front end or head 82 has a vertical dovetail groove, in which fits a dovetail projection 83 of the carriage, the dovetail 83 sliding in the head. (See Figs. I and V.)

84 is a cog-segment engaging the teeth of the rack-bar 81. This segment 84 is carried on a rock-shaft 85, whose arm 86 is connected by a rod 87 with a sliding plate 88. The plate 88 works between vertical guides 89, fixed to the body of the machine, and carries an anti-friction wheel 90, working in the groove of the cam 91 on the main shaft 49, so that the rotation of the cam causes the reciprocation of the carriage, while it is allowed to rest in its front and back positions for the required time. (For the parts last described see Figs. I, II, III, IV, V, and XI.) When the carriage is in its rear position, each last is beneath an annular plate 92, whose lower surface is made to fit the top of the crimpers.

At 93 are holes for the passage of the tacks by which the edge 23 of the upper is fastened to the insole. The plates 92 are connected together by a bridge 94, which is made fast to the fixed frame of the machine by an extension 95 upon it and screw-bolts 96 passing through the extension, which is shown with holes for these bolts in Fig. XXVII. The plate 92 has an offset upon it, forming an annular rabbet-groove 97, in which sets the lower edge of the ram-frame 98. Each ram 99 has endwise movement in bearings 101, and has a point 100 of reduced diameter, which passes through the tack-holes 93 and forces the tack 102 through the crimper-plates 19 or 20, as the case may be, and through the edge 23 of the upper and insole 75. (See Figs. I, III, XVII, XVIII, and XIX.)

The means for lifting the carriage and forcing the crimpers against the bottom of the plate 92 will be now described.

103 is a spider having arms 104, whose ends are beneath the four corners of the carriage, so that when the spider is raised the carriage is raised with it. At the center of the spider is a screw-rod 105, which extends down through the eye of a bracket 106 and carries above and below the bracket a nut 107, so that the spider may be vertically adjusted on the bracket. The bracket has a dovetail slide 108, which works vertically in guides 109 upon a cross-bar 110 of the main frame. The bracket has a lug 111, to which is hinged the fore end of a lever 112, said lever being fulcrumed at 113 to the main frame.

114 is a cam upon the main shaft 49, said cam coming in contact with an anti-friction roller on the rear end of the lever and depressing said end, and thus raising the spider and the carriage at each rotation of the shaft. (See Figs. I, V, and IX.)

Upon the middle of the bridge 94 are standards 115, which form the vertical guides of a sliding block 116. Upon the block 116 is a cross-bar 117, ending in brackets 118. To the ends 119 of each bracket are bolted plates 120, having divergent arms 121, slotted longitudinally at the ends, the slots 122 receiving slotted lugs 123 upon the rams. Across the slot 122 is a pin passing through the slot of the lug 123. To the central part of each bracket 118 are attached metal strips, forming arms 121, similar to the arms at the ends of the bracket and similarly connected with the rams, so that as the block 116 ascends and descends the rams 99 ascend and descend. The arms 121 are somewhat flexible, so that the downward movement of the rams is accommodated to leather 23 of different thicknesses. The holes 93 are countersunk upon the under side, so that if the tacks are not forced down flush with the surface of the leather 23 the crimpers may be drawn back without difficulty, the flexibility of the crimpers allowing them to spring upward, if needed.

To the upper part of the standard 115 is attached a bracket 124, having at its ends 125 bolt-holes to receive the screw-threaded lower ends of vertical arbors 126, by which the circular tack-hoppers are connected to the bracket. Each tack-hopper is made with a conical bottom 127, of which the center is the highest point, and at which point the end of the arbor 126 passes through. The arbor has a collar above the hopper-bottom and a nut 128 below the end of the bracket to hold the parts fixed in position. The sides 129 of the tack-hopper are cylindrical. The bottom of the hopper has a number of radial slots 130, extending from near its middle to the periphery and forming ways down which the shanks of the tacks slip, while they are supported by their heads resting upon the bottom at each edge of the slot. There are openings through the sides 129 at each slot to allow the heads of the tacks to pass through.

In connection with each slot 130 and forming a continuation of the same is the slot of a longitudinally-slotted strip 131, whose inclination is such that the tacks slip down the strip outwardly and enter an inclined tube 132, of which there is one for each of the tack-holes 93, the tack being presented in such a position to the hole 93 that it drops point first through the hole and the point rests upon the leather 23. At this time all of the rams descend and force the tacks into the leather. (See Figs. XXXIV and XXXV.) When the rams are in their normal position, their points 100 close the lower ends of the tubes 130, so that no tack can escape, and as the rams are raised into the position seen in Fig. XXXIV one tack is allowed to drop into each hole 93, the other tacks being detained by a catch 133, with a spring 134. (See Fig. XXXIV.) As the ram descends to drive the tack an inclined projection 135 on the ram moves the point of the catch from the head of the tack and allows one tack to pass down to the ram ready to fall into the hole 93 when the ram is raised. For the parts relating to the manipulation of the tacks see particularly Figs. XXVII to XXXVII, inclusive.

In order to keep the tacks stirred in the hopper and to place them point down in the slots 130, there is a rotary stirrer consisting of a loose sleeve 135, from which extend radial arms 136, armed with pins 137, which descend almost to the hopper-bottom. The outer one 138 of these stirrers is made of claw form, and its purpose is to remove from above the lower ends of the slots 130 any tacks which may have collected at those points and which would interfere with the escape of tacks from the hopper through the slots. Upon the sleeve is a bevel-wheel 139. The bevel-wheels 139 of the two tack-hoppers are connected by bevel-wheels 140 and a shaft 141, so that they turn simultaneously.

142 is a bevel-wheel engaging one of the wheels 139, and 143 is the shaft of said wheel, carrying a bevel-wheel 144, engaging a bevel-wheel 145 upon a shaft 146, which carries a bevel-wheel 147, engaging a bevel-wheel 148 on the main shaft 49. (See Figs. I and II.)

The mechanism for working the rams will now be described.

The plate 116 has upon it a lug 149, connected by a link 150 with the front end of a lever 151. (See Figs. XXVIII and I.)

152 is a rod having an extension-joint 153 and connecting the rear end of the lever 151 with a slide 154, working in guides 155. The slide carries an anti-friction roller 156, working in the groove 157 of a cam 158 upon the main shaft 149. (See Figs. I, II, IV, V, and VII.) It will be seen that the rams will be at rest in their lower position nearly the whole time and will make a rapid upward and downward movement when the friction-wheel comes to the in-bend of the groove.

159 is a belt-pulley turning loose on the counter-shaft 160, and having on the hub one member 161 of a friction-clutch, the other member 162 of the clutch being upon a clutch-collar 163, feather-keyed to the shaft and moved endwise along the shaft for clutching purposes by the hand-lever 164 at the front end of the machine. The hand-lever is connected by a rod 165 to one arm of a bell-crank 166, whose other arm 167 is forked and has inwardly-projecting studs 168, engaging in the circumferential groove 169 of the clutch-collar. (See Figs. I, II, III, IV, V, and VIII.)

On the shaft 160 is a cog-pinion 170, engaging a cog-wheel 171 on the main shaft 49.

I claim as my invention—

1. The crimpers 19 20 of a lasting-machine, adapted to move to and from the last, and cutters 38, at right angles thereto, projecting from their upper sides, substantially as set forth.

2. In a lasting-machine, a crimping-blade of thin metal plate slit at its edge and provided with tack-holes and cutters projecting from the edge of the blade, substantially as shown and described.

3. In a lasting-machine, a crimping-blade of thin metal plate adapted to extend from near the toe to near the heel of the last and curved on its surface and along its edge and provided with tack-holes and slits, substantially as shown and described.

4. The combination, with the longitudinally-moving carriage having thereon the last-support, crimpers, levers 18, and inclined plates 29, of a detent-bolt adapted to hold down the inclined plates during the forward movement of the carriages, substantially as set forth.

5. The combination, in a lasting-machine, of a carriage carrying the last-support and crimpers, a cog-rack 81, connected to the base-plate 2 of the carriage by a vertically-sliding joint 82 83, and a cog-sector 84, engaging the rack, substantially as and for the purpose set forth.

6. The combination, in a lasting-machine, of the carriage carrying the last-support and crimpers, the inclined plates 29, the cross-head 35, having a projection 76, spring-bolt 77, and bell-crank 36, having jaws 37, all substantially as and for the purpose set forth.

7. In a lasting-machine, the pressure-plate 51, supported on the lever-arm 60 and having a hand-wheel and screw for vertical adjustment, and a rack and segment for longitudinal adjustment on the lower arm, substantially as and for the purpose set forth.

8. The combination, in a lasting-machine, of the stationary tacking mechanism, a reciprocating carriage carrying the last-support and the crimpers, the lifting-spider 103, and mechanism for moving the latter, constructed and adapted to operate substantially as and for the purpose set forth.

9. In a lasting-machine, the combination, with the lasting mechanism, of a tack-hopper having a conical bottom with outwardly-extending slots 130 and a rotary agitator having stirring-fingers 137 and hooked fingers 138 above the lower ends of the slots, substantially as set forth.

10. The combination, with the lasting mechanism, of a tacking device consisting of a hopper having a slotted conical bottom, a rotary agitator and tack-guides 131 132, and plate 92, to tack-holes 93 of which the guides lead, all substantially as and for the purpose set forth.

11. The combination, in a lasting-machine, of the fixed plate 92, having tack-holes 93, the movable crimping-plates, as 19, having tack-holes 25, adapted to register with the holes 93 when the carriage supporting the last is in its upper position, and means for driving tacks through the registered holes, substantially as and for the purpose set forth.

12. The combination, with a lasting device, of a tacking device consisting of the tack-driving rams 99, reciprocating bracket 118, carrying flexible arms 121, engaging the rams, and means for actuating the bracket, substantially as and for the purpose set forth.

JONATHAN EMERY.

Witnesses:
SAML. KNIGHT,
E. S. KNIGHT.